United States Patent
Kadowaki et al.

(10) Patent No.: US 6,885,980 B2
(45) Date of Patent: Apr. 26, 2005

(54) SIGNAL-PROCESSING METHOD, SIGNAL-PROCESSING PROGRAM, RECORDING MEDIUM, STORING THE SIGNAL-PROCESSING PROGRAM AND SIGNAL PROCESSOR

(75) Inventors: Soichi Kadowaki, Kawasaki (JP); Kozo Umeda, Sapporo (JP); Jyota Miyakura, Sapporo (JP); Tomonori Goto, Sapporo (JP)

(73) Assignee: Mitutoyo Corporation, Kawasaki (JP)

( * ) Notice: Subject to any disclaimer, the term of this patent is extended or adjusted under 35 U.S.C. 154(b) by 40 days.

(21) Appl. No.: 10/654,431

(22) Filed: Sep. 4, 2003

(65) Prior Publication Data

US 2004/0162708 A1 Aug. 19, 2004

(30) Foreign Application Priority Data

Feb. 18, 2003 (JP) .................................... 2003-039930

(51) Int. Cl.$^7$ ............................ G06F 15/00; G06F 1/26
(52) U.S. Cl. ..................................................... 702/190
(58) Field of Search ................................ 702/190–197, 702/155–158, 166–167, 170

(56) References Cited

U.S. PATENT DOCUMENTS

| | | | | | |
|---|---|---|---|---|---|
| 5,570,304 A | * | 10/1996 | Mark et al. | ..................... | 703/7 |
| 5,608,856 A | * | 3/1997 | McInally | ..................... | 345/442 |
| 5,652,715 A | * | 7/1997 | Hanson | ..................... | 702/191 |
| 5,822,456 A | * | 10/1998 | Reed et al. | ................. | 382/232 |
| 6,768,817 B1 | * | 7/2004 | Cheng et al. | ............... | 382/232 |
| 2001/0015142 A1 | * | 8/2001 | Fangmeyer et al. | ......... | 101/32 |

FOREIGN PATENT DOCUMENTS

| | | |
|---|---|---|
| JP | A 8-278343 | 10/1996 |
| JP | A 9-179992 | 7/1997 |

\* cited by examiner

Primary Examiner—John Barlow
Assistant Examiner—Demetrius Pretlow
(74) Attorney, Agent, or Firm—Oliff & Berridge, PLC (57) ABSTRACT

A signal-processing method is disclosed, where, after inputting a measurement data, weighted spline formula is selected to calculate an initial value of a spline filter, weight is adjusted, a spline filter output is calculated, convergence is judged thereafter. When the weight is judged not converged, the weight is updated and the weight-adjustment and spline filter output calculation are repeated to conduct robust spline filtering on the measurement data.

11 Claims, 6 Drawing Sheets

SIGNAL-PROCESSING METHOD, SIGNAL-PROCESSING PROGRAM, RECORDING MEDIUM, STORING THE SIGNAL-PROCESSING PROGRAM AND SIGNAL PROCESSOR

BACKGROUND OF THE INVENTION

1. Field of the Invention

The present invention relates to a signal-processing method, which specifically relates to a signal-processing method for filtering a data obtained by measuring surface texture of a workpiece such as dimension, shape, waviness and roughness.

2. Description of the Related Art

Measuring instruments for measuring surface texture of a workpiece e.g. profile, roughness and waviness, such as a coordinate measuring machine for measuring three-dimensional shape of a workpiece, a form measuring machine and an image measuring machine for measuring two-dimensional profile, a roundness measuring machine for measuring roundness and a surface roughness tester for measuring waviness and roughness of a workpiece surface have been conventionally known. In such measuring instruments, a contact-type or non-contact type sensor and a workpiece are relatively moved to collect measurement data of the workpiece surface.

Usually, disturbance such as noise is contained in thus collected measurement data.

The disturbance is usually an electric and magnetic induction noise containing high-frequency components, however, when the profile of the workpiece surface is to be measured, surface roughness and waviness can be the disturbance.

In order to eliminate the disturbance as necessary, the measurement data is often filtered to remove, for instance, the high-frequency components.

The simplest filter arrangement is a time constant circuit composed of resistor and capacitor, which is used when the measurement data is an analogue signal. However, since such time constant circuit normally causes phase distortion, the filtered measurement data becomes round where the surface profile of the workpiece suddenly changes, so that the surface roughness information cannot be accurately reflected.

Another solution has been proposed, in which measurement data is converted from an analogue signal to a digital signal and the digital signal is filtered by a filtering program on a computer.

With the use of the filtering program, filtering process approximately equal to a time constant circuit can be conducted and a filtering process causing no phase distortion such as Gaussian filter can be easily conducted.

However, according to the Gaussian filter and 2CR filter, the measurement data may be deformed in the start or the end area of the measurement data and trackability for long-cycled waviness component contained in the measurement data may not be sufficient.

Further, when suddenly changing outlier is locally contained in the measurement data, the filtered data can be locally deformed under the influence of the outlier.

A spline filter is used in order to avoid the above disadvantages.

The spline filter can restrain the deformation in the start or end area of the measurement data and has excellent trackability for the long-cycled waviness component contained in the measurement data.

However, the filtering result by the spline filter can be greatly varied for a slight fluctuation of the measurement data. In order to solve the problem, in an invention disclosed in Japanese Patent Laid-Open Publication No. Hei 9-179992, a spline curve is calculated after over-sampling and filtering and a plurality of spline curves are calculated considering the magnitude of the error between the spline curve and interpolation data, the spline curves being summed up to obtain a final curve. However, since originally unexisted data is generated by the over-sampling, the method lacks reliability when being applied for measurement data such as surface texture of a workpiece.

Another invention is disclosed in Japanese Patent Laid-Open Publication No. Hei 8-278343, where high-frequency components of signal wave is removed when the power thereof exceeds a predetermined value and the signal wave is divided into a plurality of sections each of which is spline-smoothed. However, since the respective data is combined after smoothing the spline for each section, smoothness at respective nodes is hard to predict and also lacks reliability sufficient for being applied on the measurement data of workpiece surface texture.

SUMMARY OF THE INVENTION

The present invention is aimed at solving the above problems, which provides a highly reliable signal-processing method capable of being applied to a measurement data such as surface texture of a workpiece, signal-processing program, and a recording medium storing the signal-processing program and a signal processor.

A signal-processing method according to an aspect of the present invention is for filtering a measurement data of a predetermined dimension, the method including: a measurement data input step for inputting the measurement data along a measurement path; a selecting step for selecting a weighted spline filter formula in accordance with the type of the measurement data; an initializing step for applying weight on the measurement data by a unit matrix to obtain an initial value of a spline filter output; a weight-adjusting step for adjusting and determining the weight on the measurement data; a spline filter output calculating step for calculating the spline filter output using the weight determined in the weight-adjusting step; a convergence test step for determining a convergence of the weight; and an output step for outputting a signal-processing result based on the spline filter output, where, when the weight is not judged converged in the convergence test step, the weight is updated and the weight-adjusting step and the spline-filter output-calculating step are repeated to conduct a robust spline filtering on the measurement data.

According the above aspect of the present invention, the weighted spline filter formula is selected and the spline curve as the spline filter output is repeatedly calculated while sequentially updating the weight thereof based on the selected spline filter formula, so that the robust spline filtering having the filter output as the signal-processing result of the spline curve when the weight is converged can be applied on the measurement data. Accordingly, deformation at the start or end area of the measurement data (end-effect) can be prevented, and the shape contained in the measurement data can be extracted without being influenced by trackability for long-cycled waviness component and the noise component in the measurement data. As a result, filtering with excellent shape trackability can be conducted, thereby further enhancing the reliability of the measurement data.

The measurement data of a predetermined dimension refers to one-dimensional time-series data (e.g. data obtained by measuring displacement on Y-axis at a predetermined interval in X-axis direction for orthogonal X and Y-axes), two-dimensional data (e.g. free-form curve on X-Y plane defined by orthogonal X and Y-axes), three-dimensional data (e.g. free-form spatial curve data in XYZ space defined by orthogonal X, Y and Z-axes), polar coordinates defined by radius and angle, and the like.

Inputting the measurement data along a measurement path includes inputting the measurement data by profiling measurement of a workpiece surface as well as inputting the measurement data along a predetermined scanning direction.

In the signal-processing method according the above aspect of the present invention, the weight determined in the weight-adjusting step is preferably less adjusted as a deviation of the measurement data from the spline curve calculated by the weighted spline filter formula becomes greater.

According to the above arrangement, since measurement data loses the weight thereof as the deviation from the spline curve calculated by the weighted spline filter formula becomes greater, robust spline filtering without being influenced by outlier contained in the measurement data is possible. Specifically, the spline curve is repeatedly calculated while applying small weight on the measurement data remote from the spline curve and heavy weight on the measurement data near the spline curve. Then, the spline curve is gradually approximated to the original shape component (e.g. true shape value of a workpiece) contained in the measurement data. The final spline curve when the weight is judged converged is regarded as a shape component having sufficiently small error relative to the original shape component. As a result, extremely accurate robust spline filtering can be conducted.

In the signal-processing method according to the above aspect of the present invention, the predetermined dimension of the measurement data preferably includes two or more dimension components orthogonal with each other, and the deviation of the measurement data is preferably determined based on a sum of squares of the respective dimension components.

According to the above arrangement, when the measurement data is two-dimensional data or three-dimensional data on orthogonal coordinates, the deviation of the measurement data relative to the spline curve is determined based on the sum of squares of the component of respective axes (for instance, X-axis component, Y-axis component and Z-axis component), the deviation can be easily calculated. Accordingly, the weight of the respective measurement data can be easily determined.

In the signal-processing method according to the above aspect of the present invention, the weight is preferably judged converged when a change in the weight determined in the weight-adjusting step becomes a predetermined value or less in the convergence test step.

According to the above arrangement, since the weight is judged converged when the change in the weight during the repeated-loop process becomes a predetermined value or less, increase in processing time on account of unnecessary repeated loop can be avoided and the time required for robust spline filter processing can be reduced. Further, since the error of the spline curve when the change in the weight becomes the predetermined value or less relative to the original shape component contained in the measurement data is considered sufficiently small, extremely accurate robust spline filtering can be conducted.

In the signal-processing method according to the above aspect of the present invention, the output step preferably includes: a weight-updating step for updating the weight to 1 when the weight of the measurement data exceeds a predetermined value; a spline filter re-output calculating step for calculating the spline filter output based on the updated weight; and a signal-processing result output step for outputting the spline filter output in the spline filter re-output calculating step as a signal-processing result.

According to the above arrangement, when the weight at the time the weight is judged converged in the convergence test step exceeds a predetermined value, the weight is updated to 1 and the spline filter output is re-calculated to be outputted as the signal-processing result. Specifically, when the weight is judged converged after repeating the weight-adjusting step and the spline filter output calculation step, the measurement data where the weight exceeds the predetermined value is considered as an effective data and, after updating the weight thereof to 1, the spline filter output is calculated again, so that the robust spline filter processing for the measurement data can be more securely conducted. Then, since the result is outputted as the signal-processing result, a spline curve with sufficiently small error relative to the original shape component contained in the measurement data can be calculated. Consequently, robust spline filtering with excellent shape trackability can be achieved.

In the signal-processing method according to the above aspect of the present invention, the predetermined dimension of the measurement data preferably includes two or more dimension components orthogonal with each other, and the spline filter output preferably is calculated based on the result of the weighted spline filtering for the respective components.

According to the above arrangement, even when the measurement data is a two-dimensional data or a three-dimensional data, since the spline filter output can be obtained based on the result of weighted spline filter calculation for respective axes component (e.g. X-axis component and Y-axis component), the calculation process can be simplified for a complicated curve, so that the time required for robust spline filter calculation for a measurement data can be reduced.

In the signal-processing method according to the above aspect of the present invention, the measurement data is preferably inputted at a predetermined interval along the measurement path.

According to the above arrangement, since the measurement data can be inputted along the measurement path at a predetermined interval in inputting the measurement data by profiling measurement on the workpiece surface as well as in inputting the measurement data along a predetermined scanning direction, a shape-changing point (e.g. changing point from a straight line to an arc or a boundary point of a step portion) can be more accurately recognized than an arrangement where the measurement data is inputted in X-axis direction at a predetermined interval. In other words, error in shape determination can be prevented and highly reliable measurement data can be inputted.

The signal-processing method according to the above aspect of the present invention preferably includes a step of canceling a locally isolated outlier relative to the measurement data.

According to the above arrangement, locally protruding (isolated) data (for instance, a data having extremely different value relative to the data on both sides) on account of strong induction noise generated by a noise source such as a power plant in a factory can be removed as a distinct outlier in advance, the reliability of the robust spline filtering can be further enhanced.

A signal-processing program according to another aspect of the present invention is characterized in that the signal-processing method according to the above aspect of the present invention is executed by a computer. A recording medium according to still another aspect of the present invention is characterized in that the above signal-processing program is recorded in a manner capable of being read out by a computer. A signal processor according to further aspect of the present invention is characterized in that the above signal-processing program is executed by a computer.

According to the above arrangement, by installing a computer having a CPU (Central Processing Unit) and a memory (storage) and setting a program so that the computer executes the above steps, various parameters including deviation in accordance with the dimension of the measurement data as well as weight-adjustment and convergence test can be easily modified. The recording medium storing the program may be directly inserted to a computer to install the program into the computer or, alternatively, a reader for reading out the information on the recording medium may be externally attached to the computer and the program may be installed from the reader to the computer. Incidentally, the program may be installed to the computer through communication line such as the Internet, LAN cable and telephone line or through wireless.

DETAILED DESCRIPTION OF PREFERRED EMBODIMENT(S)

First Embodiment

Initially, weighted spline filter will be described below.

As an example, when the number of data is represented by n, measurement data is represented by yk (k=0, 1, . . . , n−1) and spline function is represented by s, a spline filter is obtained by minimizing sum of squares of residual error relative to measurement data $$\sum_{k=0}^{n-1} \{y_k - s(x_k)\}^2 \quad (1)$$

under the condition that spline energy $$\int_a^b \left\{ \frac{d^2 s(x)}{dx^2} \right\}^2 dx \quad (2)$$

is minimized. In other words, when I(s) is represented by the following formula, $$I(s) = \sum_{k=0}^{n-1} \{y_k - s(x_k)\}^2 + \lambda \int_a^b \left\{ \frac{d^2 s(x)}{dx^2} \right\}^2 dx \quad (3)$$

the spline filter is obtained by minimizing the I(s) (where λ represents Lagrange constant).

When weight for the residual error at respective measurement point is represented by wk (k=0, 1, . . . , n−1), following formula adapted to weighted spline filter can be obtained.

$$I(s) \sum_{k=0}^{n-1} w_k \{y_k - s(x_k)\}^2 + \lambda \int_a^b \left\{ \frac{d^2 s(x)}{dx^2} \right\}^2 dx \quad (4)$$

The spline function s is digitized at a constant pitch where the second term is modified as $$\alpha \sum_{k=0}^{n-1} \nabla^2 s(x_k) \quad (5)$$

Then, following equation is established.

$$I(s) \sum_{k=0}^{n-1} w_k \{y_k - s(x_k)\}^2 + \alpha \sum_{k=0}^{n-1} \nabla^2 s(x_k) \quad (6)$$

In the above:

$$\nabla^2 S(X_k) = S(X_{k+1}) - 2S(X_k) + S(X_{k-1}) \quad (7)$$

Accordingly, a value Sk of discrete spline for minimizing I(s) satisfies the following formula.

$$\frac{\partial I(s_0, s_1, \cdots s_{n-1})}{\partial s_k} = 0 \quad (8)$$

$$k = 0, 1, \cdots, n-1$$

The weighted spline filter is defined as a spline function for minimizing I(s) in the formula (6).

In order to represent the weighted spline filter for non-periodic measurement data as a matrix, when a boundary condition of non-periodic measurement is:

$$\nabla^2 S(X_0) = 0 \, \nabla^2 S(X_{n-1}) = 0 \quad (9)$$

since following formula, $$\frac{\partial I}{\partial s_0} = -2w_0(y_0 - s_0) + 2\alpha(s_2 - 2s_1 + s_0) \quad (10)$$

$$\frac{\partial I}{\partial s_1} = -2w_1(y_1 - s_1) + 2\alpha(s_3 - 4s_2 + 5s_1 - 2s_0)$$

$$\frac{\partial I}{\partial s_k} = -2w_k(y_k - s_k) + 2\alpha(s_{k+2} - 4s_{k+1} + 6s_k - 4s_{k-1} + s_{k-2})$$

-continued $$k = 2, 3, \cdots, n-3$$

$$\frac{\partial I}{\partial s_{n-2}} = -2w_{n-2}(y_{n-2} - s_{n-2}) + 2\alpha(s_{n-4} - 4s_{n-3} + 5s_{n-2} - 2s_{n-1})$$

$$\frac{\partial I}{\partial s_{n-1}} = -2w_{n-1}(y_{n-1} - s_{n-1}) + 2\alpha(s_{n-3} - 2s_{n-2} + s_{n-1})$$

is established by substituting Q as $$Q = \begin{bmatrix} 1 & -2 & 1 & & & & \\ -2 & 5 & -4 & 1 & & & \\ 1 & -4 & 6 & -4 & 1 & & \\ & \ddots & \ddots & \ddots & \ddots & \ddots & \\ & & 1 & -4 & 6 & -4 & 1 \\ & & & 1 & -4 & 5 & -2 \\ & & & & 1 & -2 & 1 \end{bmatrix} \quad (11)$$

the matrix of the weighted spline filter for non-periodic data can be expressed as $$(W + \alpha Q)S = WY \quad (12)$$

where $$W = \begin{pmatrix} w_0 & & & & & \\ & w_1 & & & & \\ & & \ddots & & & \\ & & & w_{n-3} & & \\ & & & & w_{n-2} & \\ & & & & & w_{n-1} \end{pmatrix} \quad S = \begin{pmatrix} s_0 \\ s_1 \\ \vdots \\ s_{n-3} \\ s_{n-2} \\ s_{n-1} \end{pmatrix} \quad Y = \begin{pmatrix} y_0 \\ y_1 \\ \vdots \\ y_{n-3} \\ y_{n-2} \\ y_{n-1} \end{pmatrix} \quad (13)$$

Next, in order to represent the weighted spline filter for periodic measurement data as a matrix, when periodic boundary condition of the periodic measurement data is represented as $$S_{k+n} = S_k \quad k = 0, 1, \ldots, n-1 \quad (14)$$

since $$\frac{\partial I}{\partial S_k} = -2w_k(y_k - s_k) + 2\alpha(s_{k+2} - 4s_{k+1} + 6s_k - 4s_{k-1} + s_{k-2}) \quad (15)$$

$$k = 0, 1, \cdots, n-1$$

for $$\tilde{Q} = \begin{bmatrix} 6 & -4 & 1 & & & 1 & -4 \\ -4 & 6 & -4 & 1 & & & 1 \\ 1 & -4 & 6 & -4 & 1 & & \\ & \ddots & \ddots & \ddots & \ddots & \ddots & \\ & & 1 & -4 & 6 & -4 & 1 \\ 1 & & & 1 & -4 & 6 & -4 \\ -4 & 1 & & & 1 & -4 & 6 \end{bmatrix} \quad (16)$$

the matrix of the weighted spline filter for periodic measurement data can be represented as $$(W + \alpha \tilde{Q})S = WY \quad (17)$$

The amplitude characteristic and phase characteristic of the spline filter at steady state will be described below.

Following spline filter formula $$y_k = s_k + \alpha(s_{k+2} - 4s_{k+1} + 6s_k - 4s_{k-1} + s_{k-2}) \quad k=0, 1, \ldots, n-1 \quad (18)$$

where weight W=I (unit matrix), is expressed by z-transform as $$Y_k = S_k + \alpha(Z^{-2} - 4Z^{-1} + 6 - 4Z + Z^2)S_k \quad (19)$$

Transfer function H(z) of the spline filter is represented by $$H(z) = \frac{S_k}{y_k} \quad (20)$$

$$= \frac{1}{1 + \alpha(z^{-2} - 4z^{-1} + 6 - 4z + z^2)}$$

In order to examine the amplitude characteristic and phase characteristic, Z is substituted as $$Z = e^{j\omega \Delta x} \quad (21)$$

so that following formula is established.

$$H(\omega) = \frac{1}{1 + \alpha(e^{-2j\omega \Delta x} - 4e^{-j\omega \Delta x} + 6 - 4e^{j\omega \Delta x} + e^{2j\omega \Delta x})} \quad (22)$$

Since $$e^{-j\alpha} + e^{j\alpha} = 2\cos\alpha \quad (23)$$

following equation is established.

$$\begin{aligned} e^{-2j\omega \Delta x} - 4e^{-j\omega \Delta x} + & \\ 6 - 4e^{j\omega \Delta x} + e^{2j\omega \Delta x} &= 2\cos(2\omega \Delta x) - 8\cos(\omega \Delta x) + 6 \\ &= 2 - 4\sin^2(\omega \Delta x) - 8\cos(\omega \Delta x) + 6 \\ &= -16\sin^2\left(\frac{\omega \Delta x}{2}\right)\cos^2\left(\frac{\omega \Delta x}{2}\right) - 8 + \\ &\quad 16\sin^2\left(\frac{\omega \Delta x}{2}\right) + 8 \\ &= 16\sin^4\left(\frac{\omega \Delta x}{2}\right) \end{aligned} \quad (24)$$

Accordingly, amplitude characteristic can be represented as $$|H(\omega)| = \frac{1}{1 + 16\alpha \sin^4\left(\frac{\omega \Delta x}{2}\right)} \quad (25)$$

On the other hand, the phase characteristic is represented as $$\text{Arg}^* H(\omega) = 0 \quad (26)$$

and it is proved that the spline filter is a phase-compensating filter.

As an example, when a filter of 50% attenuation at a cutoff frequency $\omega = \omega C$ is to be obtained, the amplitude characteristic may be set as $$H(\omega_c) = \frac{1}{2} \quad (27)$$

and a constant a can be expressed as in the following equation.

$$\alpha = \frac{1}{16 \sin^4\left(\frac{\omega_C \Delta x}{2}\right)} \quad (28)$$

Figure 5:
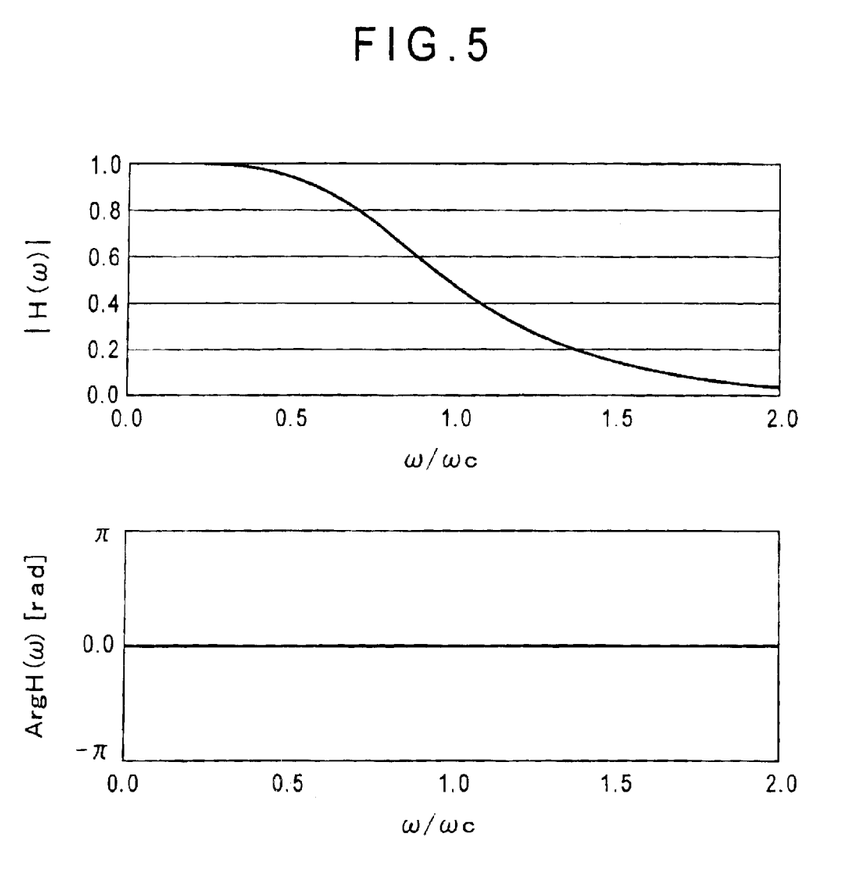
FIG. 5 is an illustration showing transfer characteristic of the signal-processing method according to the present invention.

The transfer characteristic (amplitude characteristic, phase characteristic) of the 50% attenuation filter at the cutoff frequency $\omega=\omega C$ will be shown in FIG. 5.

Next, solution of thus defined weighted spline filter will be described below.

The matrix form of the weighted spline filter $$(W+\alpha Q)S=WY \quad (29)$$

has symmetric matrix $$M=W+\alpha Q \quad (30)$$

on the coefficient matrix at the left-side of the equation.

Decomposition of M into lower triangular matrix L and diagonal matrix D by modified Cholesky decomposition (decomposition of the matrix M can be very efficiently conducted since the matrix M is a sparse matrix) results in $$M=LDL^T \quad (31)$$

and the weighted spline filter can be represented as $$LDL^TS=WY \quad (32)$$

When $$DL^TS=X \quad (33)$$

then $$LX=WY \quad (34)$$

Since L is a lower triangular matrix, X can be easily calculated. Further, since $$L^TS=D^{-1}X \quad (35)$$

S can be easily calculated based on the calculated X.

In actually applying the present invention, the matrix M may become singular when $$W^m{}_k=0 \quad (36)$$

Accordingly, it is ideally preferable that the matrix is solved by singular value decomposition method. However, when singular value decomposition method is employed, a great-capacity storage and much processing time are required. On the other hand, in applying the present invention to the actual measurement data, it is rare that the matrix M becomes singular, and when the matrix M is singular, it is presumed that the measurement data itself is defective. Therefore, Gill-Murray modified Cholesky decomposition capable of outputting some solution even when the matrix M is singular is applied to achieve both calculation efficiency and countermeasure for singular matrix.

Weighted spline filter supported by a solution can be deduced as described above and a robust spline filter is obtained by repeating calculation until convergence condition is satisfied while updating the weight W.

Figure 1:
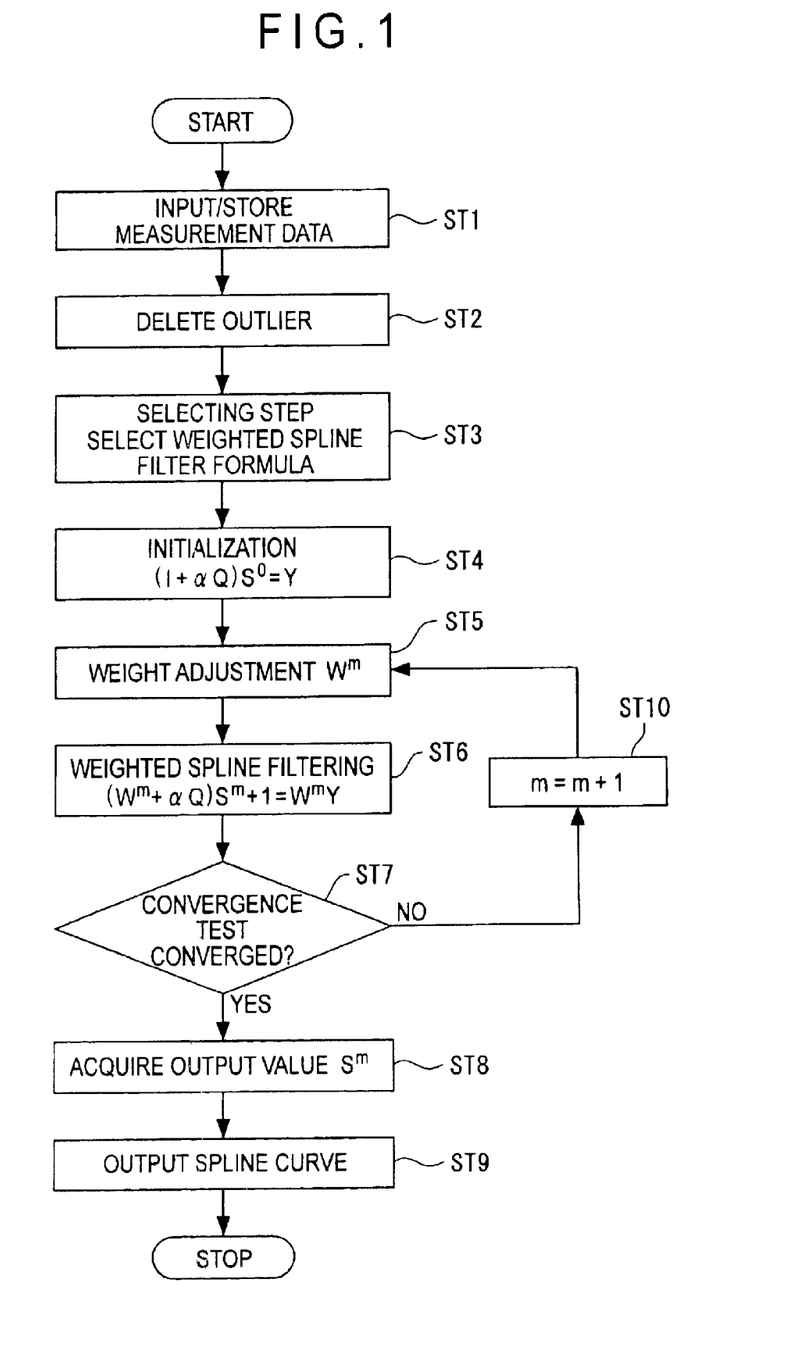
FIG. 1 is a flowchart showing signal-processing process in a signal-processing method according to a first embodiment of the present invention.
Figure 2:
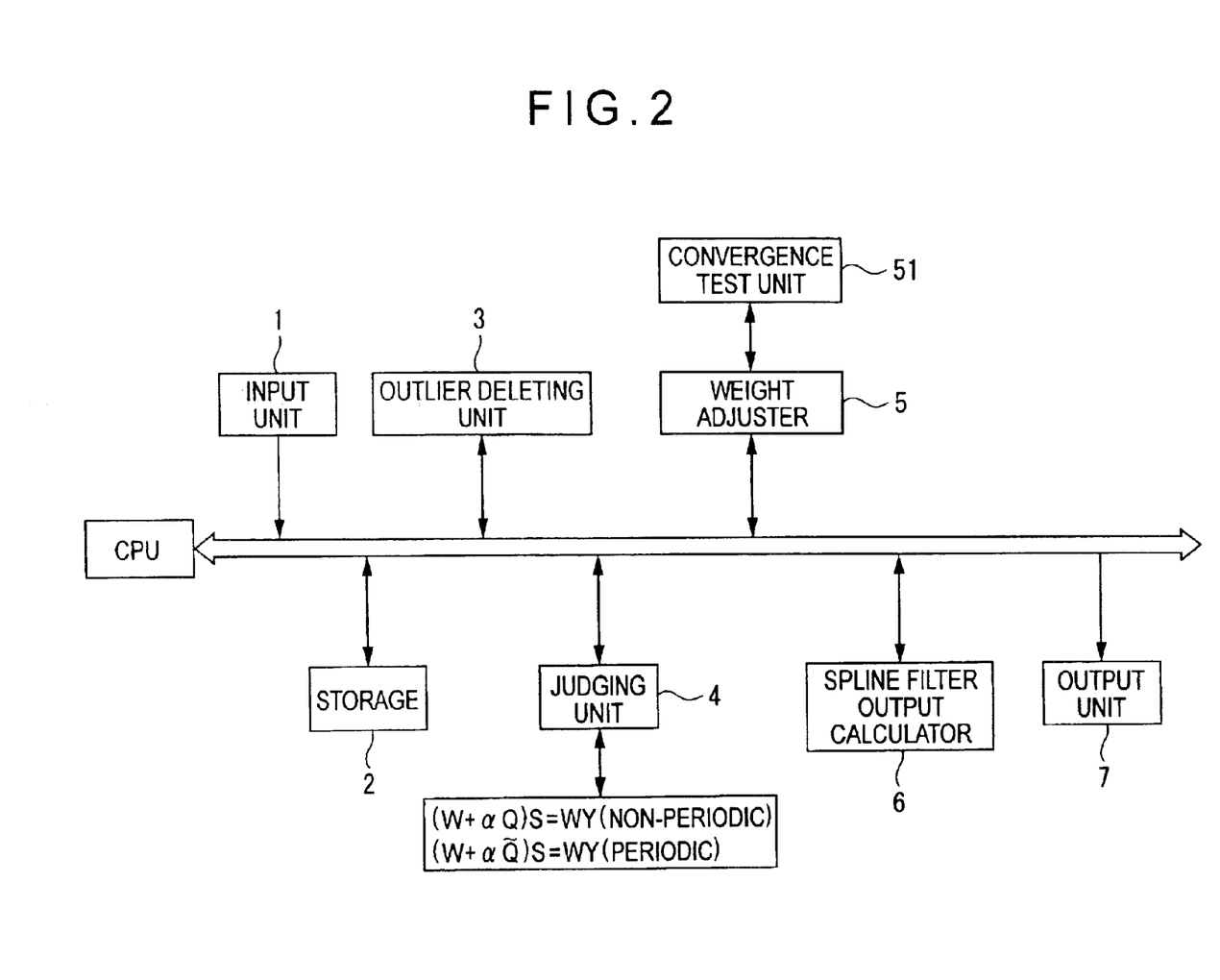
FIG. 2 is a functional block diagram of a signal-processing device in the first embodiment.

FIG. 1 is a flowchart showing a first process and FIG. 2 is a functional block diagram of a device executing the robust spline processing. In the above process, a measurement data input step for inputting a measurement data and a selecting step (ST3) for selecting weighted spline filter formula are initially executed.

During the measurement data input step, a step ST1 for inputting the measurement data from a measuring instrument etc. by an input unit 1 to store the data in a storage such as a computer, and a step ST2 for deleting locally isolated outlier contained in the stored measurement data by an outlier deleting unit 3 are executed.

In the present embodiment, the measurement data is a one-dimensional time-series data measured by a roughness-measuring machine, where, for instance, a probe of a surface roughness tester is moved in a direction (x-direction) to obtain a roughness data y at a predetermined pitch in x-direction. Whether a data is an outlier or not can be easily determined by checking whether deviation of the measurement data relative to least square curve is not less than a predetermined value and not more than a predetermined width or not.

Subsequently, in the selecting step ST3, whether the measurement data is non-periodic or periodic is judged by a judging unit 4 and weighted spline filter formula is selected in accordance with the judgment. Specifically, the formula (12) and the formula (17) are selectably used in accordance with the judgment whether the measurement data is non-periodic or periodic.

Next, initializing step (ST4) is conducted, where an initial value S0 of the output of the spline filtering when W=I (non-robust spline filtering calculation) is obtained, as illustrated.

Next, based on the measurement data Y and Sm (m indicates repetition step), weight Wm is adjusted and determined by a weight adjuster 5 according to below-described process (ST5).

Subsequently, spline filter output Sm+1 is calculated based on weighted spline filter $$(W^m+\alpha Q)S^{m+1}=W^mY \quad (37)$$

by a spline filter output calculator 6 (ST6).

Then, below-described weight convergence judgment (ST7) is conducted by a convergence judging unit 51 and, when convergence condition is not satisfied, m is updated (m=m+1) (ST10) to re-adjust the weight Wm (ST5).

When the convergence condition is satisfied (ST7: YES), the repeating process is terminated to obtain the output value Sm (ST8) and the spline curve is outputted to an output unit 7.

In the above process, in order to adjust the weight Wm (ST5), adaptive biweight method is applied as follows.

$$W_k^m = \begin{cases} \left[1-\left(\frac{y_k - s_k^m}{\beta \cdot c}\right)^2\right]^2 & |y_k - s_k^m| < \beta \cdot c \\ 0 & |y_k - s_k^m| \geq \beta \cdot c \end{cases} \quad (38)$$

Here, with reference to $\sigma$ denoting standard deviation of the residual error, $$\beta = \text{median}\left\{\left|\frac{y_k - s_k^m}{\sigma}\right|\right\} \quad (39)$$

$$c = \begin{cases} 6 & \beta \leq 5 \\ 10 & 5 < \beta \leq 100 \\ 20 & 100 < \beta \end{cases} \quad (40)$$

The convergence condition of ST7 is met when weight variation becomes sufficiently small and following formula is satisfied, and the repetition process is terminated.

$$\sum_{k=0}^{n-1} |w_k^m - w_k^{m-1}| < 0.02 \cdot \sum_{k=0}^{n-1} w_k^m \quad (41)$$

Figure 3A:
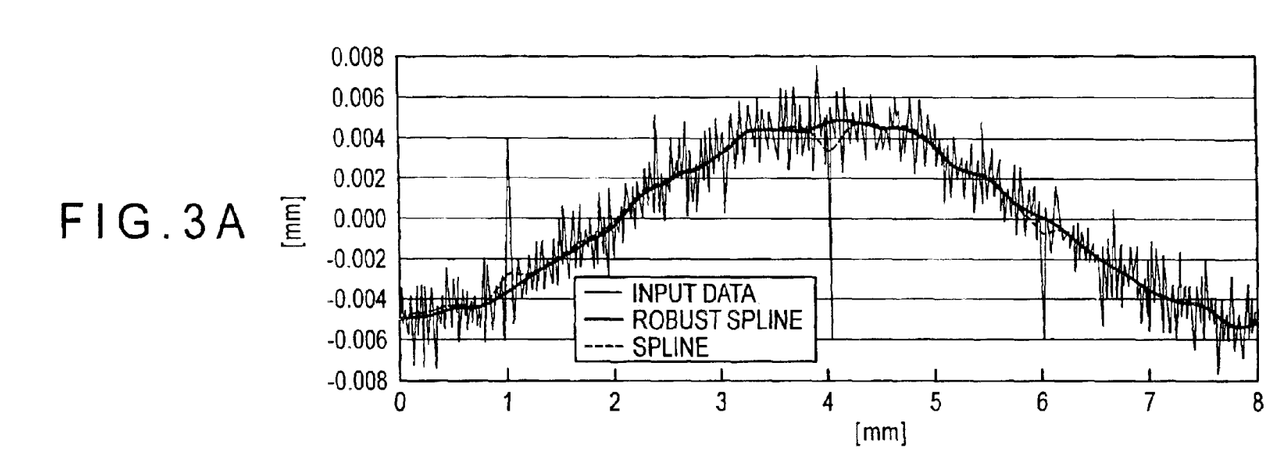
FIG. 3 is an illustration comparing a result of spline processing and a result of robust spline processing for one-dimensional time-series data in the first embodiment.
Figure 3B:
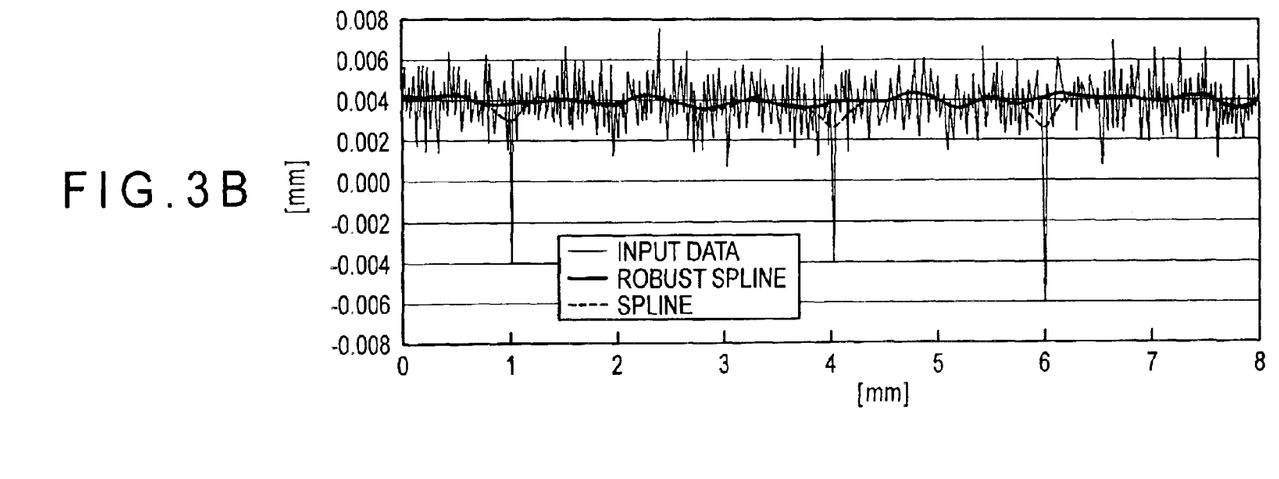

FIG. 3 shows an example where a signal-processing method by the robust spline filtering in the first embodiment is conducted for a one-dimensional time-series data. Here, both of a spline curve processed by normal spline filtering and a spline curve processed by the robust spline filtering according to the present invention are applied on the measurement data applied with a spike noise, which are shown in a superposing manner. As shown in the drawings, though the result of normal spline filtering is influenced by the spike noise, a spline curve along original shape is obtained by the robust spline filtering. Further, as shown in FIG. 3(A), excellent trackability for a shape having gentle waviness can be obtained.

According to the present embodiment, following advantages can be obtained.

(1) Since the spline filter can be easily robustized (i.e. made robust), the deformation at the start or end area of the measurement data can be prevented. Accordingly, the shape contained in a measurement data can be extracted without being influenced by trackability for long-cycled waviness component or noise component contained in the measurement data, so that filtering with excellent shape trackability can be conducted and the reliability of the measurement data can be further improved.

(2) Since locally isolated outlier contained in the measurement data can be removed, reliability of the robust spline filtering can be further enhanced.

(3) Since the weight becomes small in accordance with the magnitude of deviation of the measurement data from the spline curve calculated by the weighted spline filter formula, robust spline filtering without being influenced by the outlier contained in the measurement data is possible.

(4) Since weight convergence can be judged when the variation of weight in the repetition loop process becomes smaller than a predetermined value, unnecessary repetition loop process can be prevented, thereby reducing the robust spline filtering processing time.

Second Embodiment

Next, second processing steps for achieving a robust spline filter will be described below. Though the steps are the same as the first processing steps, different calculation formulae are used therein.

Specifically, the weighted spline filter formula $$(W + \alpha Q)S = WY \quad (42)$$

is modified as $$(I + \alpha Q)S = WY + (I - W)S \quad (43)$$

Here, $$(I + \alpha Q)S^{m+1} = W^m Y + (I - W^m)S^m \quad (44)$$

is used in repetition step m.

In the second processing step, following advantage as well as the advantages (1) to (4) in the first processing step can be expected.

(5) Since the left-side coefficient matrix $$I + \alpha Q \quad (45)$$

constantly represents the same value during the repetition step, total robust spline filtering processing time can be reduced.

Third Embodiment

Next, a signal-processing method for a measurement data as a two-dimensional data measured two-dimensionally will be described below as a third embodiment of the signal-processing method of the present invention. Here, the measurement data as a two-dimensional data refers to, for instance, (x, y) coordinates value etc. obtained by measuring profile curve of a workpiece under constant z-coordinate by a predetermined pitch using a coordinate measuring machine and the like or a data obtained by importing a figure drawn on a plane with a scanner. In other words, though the object to be processed is only y-coordinate in the first embodiment, both of x-coordinate and y-coordinate are processed in the third embodiment.

The basic arrangement of the third embodiment is the same as the first embodiment, which is characterized in a formula corresponding to the formula (6) in starting the calculation of spline curve s.

In the third embodiment, under the condition that the spline energy is minimized, a spline curve for minimizing sum of squares of the X and Y-direction distance between the measurement data (xk, yk) and point (sx(xk, yk), sy(xk, yk)) on the spline curve s corresponding to the measurement data (xk, yk) is calculated. In other words, under the above incidental condition, a spline curve s capable of minimizing I(s) represented by the following formula is calculated.

$$I(s) = \sum_{k=0}^{n-1} w_k [\{x_k - s_x(x_k, y_k)\}^2 + \{y_k - s_y(x_k, y_k)\}^2] + \\ \alpha \sum_{k=0}^{n-1} \{\nabla_x^2 s(x_k, y_k) + \nabla_y^2 s(x_k, y_k)\} \quad (46)$$

In the above, secondary approximation of laplacian on the second term of right side is represented as follows:

$$\nabla_x^2 S(X_k, Y_k) = S_x(X_{k+1}) - 2S_x(X_k) + S_x(X_{k-1}) \quad (47)$$

$$\nabla_y^2 S(X_k, Y_k) = S_y(Y_{k+1}) - 2S_y(Y_k) + S_y(Y_{k-1})$$

Then, weighted spline filter described in the first embodiment is applied for each x component and y component (see formula (37)).

In the above, the constant α can be calculated based on a sampling pitch Δl along measurement path and a cutoff wavelength λc' according to the following formula:

$$\alpha = \frac{1}{16 \sin^4(\frac{\pi \cdot \Delta l}{\lambda' c})} \quad (48)$$

Then, a spline filter for deducing the spline curve for each section of the two-dimensional measurement data can be constructed.

Further, in a robust spline filter where the processing is repeated by updating the weight W until the convergence condition (formula (41)) is satisfied, (yk−skm) in formula (38) is set as a distance between two points as represented in the following formula, which specifically is a distance between the measurement data (xk, yk) and the point (sx(xk, yk), sy(xk, yk)) on the spline curve s corresponding to the measurement data (xk, yk).

$$d_k = \sqrt{\{x_k - s_x(x_k, y_k)\}^2 + \{y_k - s_y(x_k, y_k)\}^2} \quad (49)$$

The convergence of the weight W calculated by the formula (38) applying the formula (49) is judged based on the formula (41). When the weight W is converged, a spline curve corresponding to measurement data is calculated based on the output value Sm (spline function). The spline curve is outputted to the output unit.

Figure 4A:
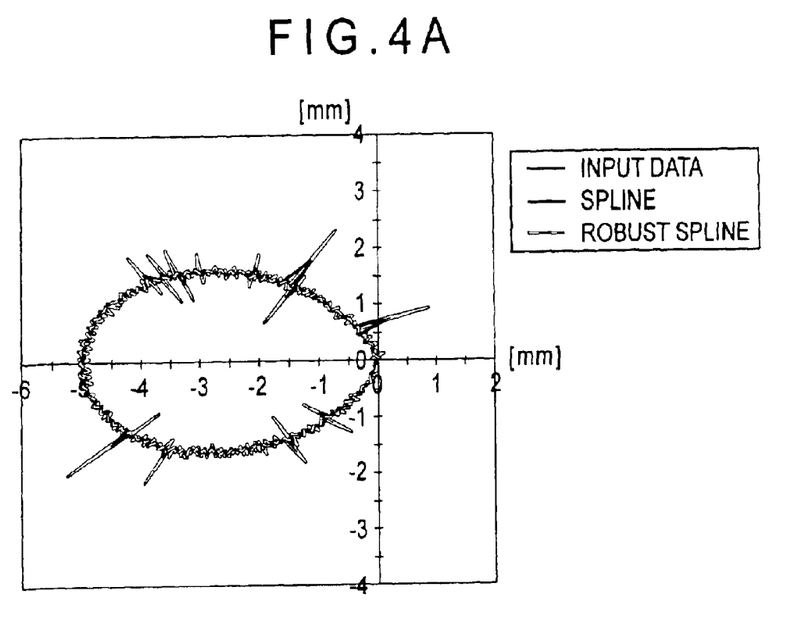
FIG. 4 is an illustration comparing a result of spline processing and a result of robust spline processing in a third embodiment of the present invention.
Figure 4B:
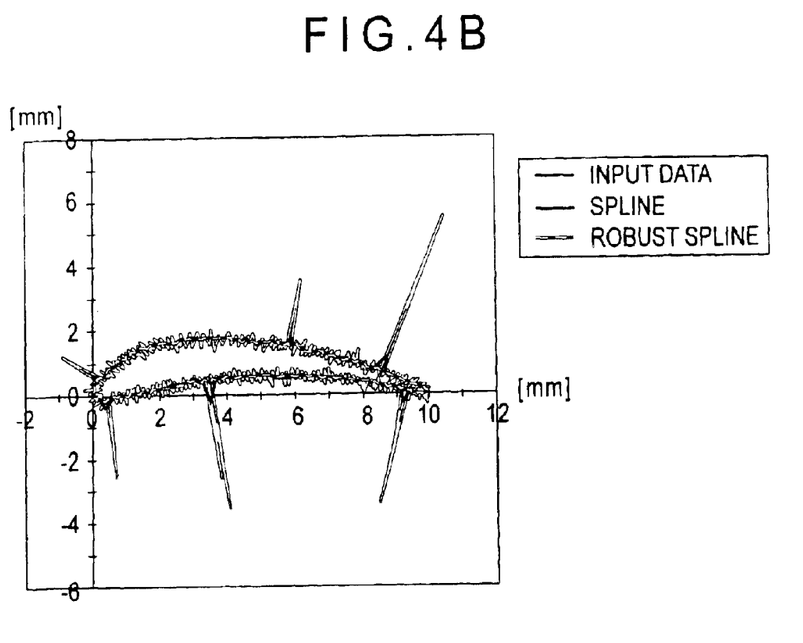

FIG. 4(A) shows a comparison of a result of spline processing on an input data applying spike nose on a folium and a result of robust spline processing thereon. As shown in FIG. 4(A), though the result by the ordinary spline processing is influenced by the spike noise, robust result restraining the spike noise can be obtained by the robust spline processing. FIG. 4(B) shows a result of spline processing on an input data applying spike noise on an airfoil and a result of robust spline processing thereon, which exhibits the same result as FIG. 4(A).

According to the third embodiment, following advantages as well as the advantages (1) to (5) in the first and the second embodiments can be obtained.

(6) When the measurement data is two-dimensional data on an orthogonal coordinates, since the deviation of the measurement data from the spline curve is determined based on the sum of squares of the components for the respective axes (for instance, X-axis component and Y-axis component), the deviation can be easily calculated. Accordingly, the weight of the respective measurement data can be easily determined.

(7) Since the spline filter output can be obtained based on the result of weighted spline filtering for the respective axes components (for instance, X-axis component and Y-axis component), the calculation process can be simplified even for a complicated curve, so that the time required for robust spline filtering calculation on a measurement data can be reduced.

(8) When two-dimensional data is obtained by profiling a workpiece on a two-dimensional plane to input as a measurement data, since the measurement data is inputted at a predetermined interval along the measurement path, shape-changing point (e.g. changing point from straight line to arc or boundary point of a step) can be more accurately recognized as compared to an arrangement where the measurement data is inputted at a predetermined interval in X-axis direction. In other words, shape judgment error can be prevented and highly reliable measurement data can be inputted.

Fourth Embodiment

Next, a signal-processing method for a measurement data as a three-dimensional data measured three-dimensionally will be described below as a fourth embodiment of the signal-processing method of the present invention. Here, the measurement data as a three-dimensional data refers to, for instance, (x, y, z) coordinates value etc. obtained by measuring a surface of a workpiece at a predetermined pitch using a coordinate measuring machine and the like. In other words, though the object to be processed is only y-coordinate in the first embodiment, all of x-coordinate, y-coordinate and z-coordinate are processed in the fourth embodiment.

The basic arrangement of the fourth embodiment is the same as the first embodiment, which is characterized in a formula corresponding to the formula (6) in starting the calculation of spline curve s.

In the fourth embodiment, under the condition that the spline energy is minimized, a spline curve for minimizing sum of squares of the X, Y and Z-direction distance between the measurement data (xk, yk, zk) and point (sx(xk, yk, zk), sy(xk, yk, zk), sz(xk, yk, zk)) on the spline curve s corresponding to the measurement data (xk, yk, zk) is calculated. In other words, under the above incidental condition, a spline curve s capable of minimizing I(s) represented by the following formula is calculated.

$$I(s) = \sum_{k=0}^{n-1} [\{x_k - s_x(x_k, y_k, z_k)\}^2 + \{y_k - s_y(x_k, y_k, z_k)\}^2 + \{z_k - s_z(x_k, y_k, z_k)\}^2] + \alpha \sum_{k=0}^{n-1} \{\nabla_x^2 s(x_k, y_k, z_k) + \nabla_y^2 s(x_k, y_k, z_k) + \nabla_z^2 s(x_k, y_k, z_k)\} \quad (50)$$

In the above, secondary approximation of laplacian on the second term of right side is represented as in the third embodiment.

Then, weighted spline filter described in the first embodiment is applied for each x, y and z component (see formula (37)). Incidentally, the constant α is defined based on a sampling pitch Δ1 along measurement path in the three-dimensional space and cutoff wavelength λc' according to the formula (48).

Then, a spline filter for deducing the spline curve for each section of the two-dimensional measurement data can be constructed.

Further, in a robust spline filter where the processing is repeated by updating the weight W until the convergence condition (formula (41)) is satisfied, (yk-skm) in formula (38) is set as a distance between two points as represented in the following formula, which specifically is a distance between the measurement data (xk, yk, zk) and point (sx(xk, yk, zk), sy(xk, yk, zk), sz(xk, yk, zk)) on the spline curve s corresponding to the measurement data (xk, yk, zk).

$$d_k = \sqrt{\{x_k - s_x(x_k, y_k, z_k)\}^2 + \{y_k - s_y(x_k, y_k, z_k)\}^2 + \{z_k - s_z(x_k, y_k, z_k)\}^2} \quad (51)$$

The convergence of the weight W calculated by the formula (38) applying the formula (51) is judged based on the formula (41). When the weight W is converged, a spline curve corresponding to measurement data is calculated based on the output value Sm (spline function). The spline curve is outputted to the output unit.

According to the fourth embodiment, following advantage as well as the advantages (1) to (5) of the advantages of the first and the second embodiments can be obtained.

(9) The advantages (6) to (8) can be achieved in a three-dimensional data. Accordingly, when the measurement data is a three-dimensional data, calculation load can be reduced without increasing processing time of the robust spline filtering.

(Modifications)

A modification of the present invention will be described below. Though the spline curve at the time of convergence judgment is directly outputted as a result of signal-processing, the spline curve is re-calculated and the result is outputted as the signal-processing result in the present modification.

Figure 6:
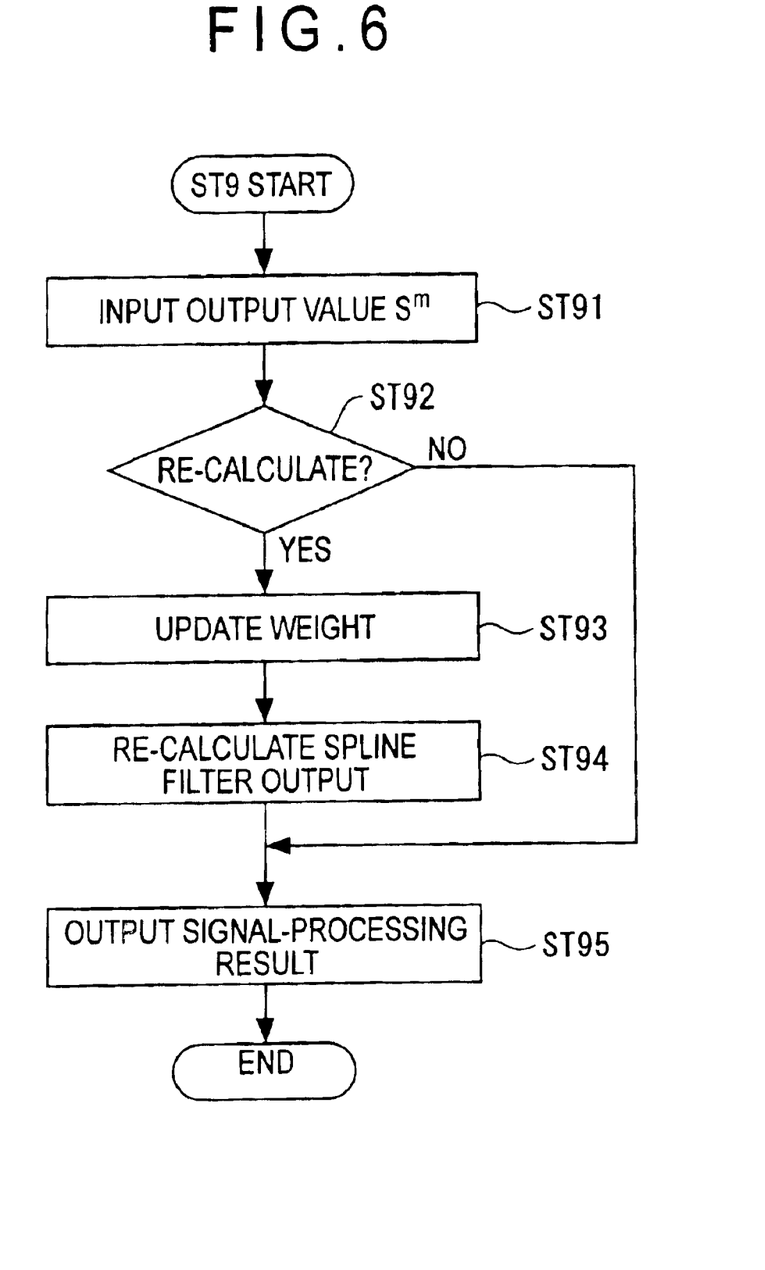
FIG. 6 is a flowchart showing a modification of the present invention.

FIG. 6 shows a modification of spline curve output (ST9) of FIG. 1.

Initially, the calculated output value Sm is inputted (ST91). Subsequently, whether re-calculation is to be conducted or not is determined (ST92). For instance, "YES" is selected when highly accurate signal-processing result is to be obtained and "NO" is selected when it is considered that sufficient accuracy has been obtained by an operator at the time, or in advance.

When the re-calculation is not conducted (NO), the spline curve of the output value Sm is outputted by the output unit 7. When the re-calculation is to be conducted (YES), weight exceeding a predetermined value designated in advance is updated to 1 (ST93). In other words, the measurement data having weight exceeding the predetermined value is judged effective and 100% contribution on the spline processing is set thereon.

Subsequently, weighted spline filtering is conducted based on the updated weight to obtain an output (ST94). The obtained spline curve is outputted by the output unit 7 as a signal-processing result (ST95).

The modification can be applied on all of the first to fourth embodiments, where the following advantage as well as the advantages (1) to (9) can be obtained.

(10) The weight is updated to 1 when the weight at the time when the weight is judged converged exceeds a predetermined value, and the spline filter output is obtained again to output the result as the signal-processing result. In other words, when the weight is judged converged after repeating the weight adjusting step and the spline filter output calculating step, the measurement data at the point where the weight exceeds the predetermined value is considered effective to update the weight thereof to 1, and the spline filter output can be re-calculated, so that the robust spline processing for the measurement data can be more securely conducted. Further, since the result is outputted as the signal processing result, a spline curve having sufficiently small error relative to the original shape component contained in the measurement data can be obtained, thus conducting robust spline filter processing with excellent shape trackability. Further, since the result is outputted as a signal-processing result, a spline curve having sufficient small error relative to original shape component contained in the measurement data can be obtained, so that the robust spline filter processing excellent in shape-trackability can be calculated.

Though preferred embodiments of the present invention is described above, the scope of the present invention is not restricted to the above embodiments but includes modifications as long as an object of the present invention can be achieved.

For instance, the present invention can be applied to three-dimensional roughness data, measurement data by a form measuring machine, data measured by roundness measuring machine, profile data measured by coordinate measuring machine and data measured by image measuring machine.

The measurement data may be collected by a contact sensor or a non-contact sensor. Further, the present invention can be applied not only on surface texture data of a workpiece but also on electric signal data generated in time-series.

Further, though the measurement data is once stored in a storage in the above embodiments, the measurement data may be calculated in so-called real-time manner each time the measurement data is collected.

Further, the present invention may be arranged as a signal-processing program for executing a signal-processing method of the present invention by a computer, which can be stored in a format capable of being executed by various computers using portable storage media such as CD-ROM. The signal-processing program may be either in a compiler form interpreted as a machine language or an interpreter form interpreted as an interlanguage.

Further, a signal processor can be constructed by executing the above signal-processing program by a computer. Specifically, the signal processor can be constructed by a measurement data input unit for executing the measurement data input step, a selector for executing the selecting step, an initializing unit for executing the initializing step, a weight adjuster for executing the weight adjusting step, a spline filter output calculator for executing the spline filter output calculating step, a convergence judging unit for executing the convergence judging step and the output unit for executing the output step.

What is claimed is:

1. A signal-processing method for filtering a measurement data of a predetermined dimension, comprising:

a measurement data input step for inputting the measurement data along a measurement path;

a selecting step for selecting a weighted spline filter formula in accordance with the type of the measurement data;

an initializing step for applying weight on the measurement data by a unit matrix to obtain an initial value of a spline filter output;

a weight-adjusting step for adjusting and determining the weight on the measurement data;

a spline filter output calculating step for calculating the spline filter output using the weight determined in the weight-adjusting step;

a convergence test step for determining a convergence of the weight; and an output step for outputting a signal-processing result based on the spline filter output, wherein, when the weight is not judged converged in the convergence test step, the weight is updated and the weight-adjusting step and the spline filter output calculating step are repeated to conduct a robust spline filtering on the measurement data.

2. The signal-processing method according to claim 1, wherein the weight determined in the weight-adjusting step is less adjusted as a deviation of the measurement data from a spline curve calculated by the weighted spline filter formula becomes greater.

3. The signal-processing method according to claim 2, wherein the predetermined dimension of the measurement data includes two or more dimension components orthogonal with each other, and wherein the deviation of the measurement data is determined based on a sum of squares of the respective dimension components.

4. The signal-processing method according to claim 1, wherein the weight is judged converged when a change in the weight determined in the weight-adjusting step becomes a predetermined value or less in the convergence test step.

5. The signal-processing method according to claim 1, the output step comprising:

a weight-updating step for updating the weight to 1 when the weight of the measurement data exceeds a predetermined value;

a spline filter re-output calculating step for calculating the spline filter output based on the updated weight; and a signal-processing result output step for outputting the spline filter output in the spline filter re-output calculating step as a signal-processing result.

6. The signal-processing method according to claim 1, wherein the predetermined dimension of the measurement data includes two or more dimension components orthogonal with each other, and wherein the spline filter output is calculated based on the result of the weighted spline filtering for the respective components.

7. The signal-processing method according to claim 1, wherein the measurement data is inputted at a predetermined interval along the measurement path.

8. The signal-processing method according to claim 1, further comprising a step of canceling a locally isolated outlier relative to the measurement data.

9. A signal-processing program, wherein the signal-processing method according to claim 1 is executed by a computer.

10. A recording medium storing the signal-processing program according to claim 9.

11. A signal processor, wherein the signal-processing program according to claim 9 is executed by a computer.

* * * * *